United States Patent [19]

Obuchi et al.

[11] Patent Number: 5,386,004
[45] Date of Patent: Jan. 31, 1995

[54] POLYHYDROXYCARBOXYLIC ACID AND PURIFICATION PROCESS THEREOF

[75] Inventors: Shoji Obuchi; Masahiro Ohta, both of Fukuoka, Japan

[73] Assignee: Mitsui Toatsu Chemicals, Inc., Tokyo, Japan

[21] Appl. No.: 130,442

[22] Filed: Oct. 1, 1993

[30] Foreign Application Priority Data

Oct. 9, 1992 [JP] Japan ................................. 4-271477

[51] Int. Cl.$^6$ ............................................. C08G 63/08
[52] U.S. Cl. ................................. 528/354; 528/357; 528/361
[58] Field of Search .................... 528/354, 357, 361

[56] References Cited

U.S. PATENT DOCUMENTS 4,447,645  5/1984  Donohue et al. .................. 562/473
4,810,775  3/1989  Bendix et al. ..................... 528/480

*Primary Examiner*—John Kight, III
*Assistant Examiner*—Shelley A. Dodson
*Attorney, Agent, or Firm*—Burns, Doane, Swecker & Mathis

[57] ABSTRACT

A purification process of a polyhydroxycarboxylic acid for efficiently removing a catalyst with a simple method from solid polyhydroxycarboxylic acid by bringing the solid polyhydroxycarboxylic acid which is obtained by a catalytic reaction and has an inherent viscosity of 0.1~5.0 dl/g into contact with an acid substance in the presence of a hydrophilic organic solvent. Also disclosed is a polyhydroxycarboxylic acid prepared by direct dehydration polymerization having an extremely reduced content of residual catalyst.

7 Claims, No Drawings

POLYHYDROXYCARBOXYLIC ACID AND PURIFICATION PROCESS THEREOF

BACKGROUND OF THE INVENTION

1. Field of the Invention

The present invention relates to a process of purifying polyhydroxycarboxylic acid which is used as a biodegradable polymer for medical plastics and as a substitute for general purpose resins and relates to polyhydroxycarboxylic acid which has an extremely low content of a catalyst.

2. Related Art of the Invention

Polyhydroxycarboxylic acid has high mechanical strengths and excellent physical and chemical properties, and is additionally biodegradable, that is, capable of being decomposed in the natural environment without giving hazardous effect and finally being converted to water and carbon dioxide by microorganisms. Consequently, polyhydroxycarboxylic acid has recently been used for medical plastics and as a substitute for general purpose resins, and has received attention in many fields of use. Particularly, environmental contamination is now an urgent problem to be solved and thus such plastic meets social requirements.

It has generally been known as a preparation process of polyhydroxycarboxylic acid that hydroxycarboxylic acid such as lactic acid and glycolic acid is dimerized by dehydration and the resulting cyclic dimer is subjected to a ring opening polymerization in the presence of a Sn-base catalyst to give polyhydroxycarboxylic acid. Such a process, however, is complex in the reaction procedures and the polymer obtained is expensive. Further, in the process, the polymer is prepared by melt-polymerization and pelletized as intact. As a result, the polymerization catalyst is unfavorably retained in the polymer and sometimes leads to give a very injurious effect on the uses of the final product. For example, in the case of slow-release medicines and other administrations to organisms, the polymer is decomposed whereas tile catalyst remains as intact in the tissue. Consequently, the polymer cannot be used because of toxicity of the catalyst. The decomposition rate of the polymer also differs depending upon the residual amount of the catalyst and the slow-release property of the medicine cannot be fully exhibited. As a result, uses of the polymer are greatly restricted by the catalyst and other impurities contained.

On the other hand, several processes which can prepare the polymer without using the above catalyst have been proposed. For example, European Patent 26599 and Japanese Laid-Open Patent SHO 56-45920 have disclosed a process for preparing a copolymer from glycolide and lactide by using a weakly acidic ion exchanger.

European Patent 171907 and Japanese Laid-Open Patent SHO 61-28521 have disclosed a process for preparing homopolymer or copolymer of lactic acid and glycolic acid by dehydrating polycondensation. It has also been disclosed a process for conducting polymerization in the presence of an inorganic solid acid catalyst. Any of these processes, however, provides a polymer having a low weight average molecular weight of 5,000~30,000. The polymer has low mechanical strengths and is unsatisfactory in chemical and physical properties, and thus has been remarkably restricted in the field of use.

As described above, in the preparation of polyhydroxycarboxylic acid having sufficiently high molecular weight, contamination with the catalyst is inevitable in the present technique unless purification is successively carried out.

Several purification processes have been disclosed in order to remove the catalyst from the polymer.

For example, Japanese Laid-Open Patent SHO 63-145327 has disclosed a process for dissolving a catalyst containing polymer in a water-immiscible organic solvent, bringing the resulting solution into contact with water or an aqueous layer containing an inorganic acid, water soluble organic acid or water soluble complexing agent, separating the organic layer and successively separating the polymer by a known process. Japanese Laid-Open Patent SHO 63-254128 has disclosed a process for carrying out purification by dissolving the polymer in a good solvent and adding a precipitant in a turbulent shear state. These processes can remove the catalyst from the polymer, but have the following problems in industry.

In the process of Japanese Laid-Open Patent SHO 63-145327, first, the polymer solution in the organic solvent has high viscosity and leads to poor contact efficiency with the aqueous layer such as inorganic acid under usual stirring. Thus, the efficiency for removing the catalyst is not so good. Second, the mixture of the polymer solution in the organic solvent with the aqueous layer is extremely difficult to separate from each other. As a result, polymer concentration must be reduced in order to improve separation and volume efficiency is remarkably impaired. Third, it is difficult to precipitate and isolate the polymer.

Japanese Laid-Open Patent SHO 63-254128 carries out precipitation and purification of the polymer at the same time. The process is more simple as compared with the above process and nevertheless, has a problem of requiring specific equipment.

In any of the above processes, steps of dissolving the polymer in a good solvent and successively adding a poor solvent to precipitate and isolate the polymer are required for removing the catalyst from the polymer. As a result, the kinds of the solvent used have been increased and a great deal of labor and equipment cost has been required. Thus, a satisfactory purification process has not yet been found.

SUMMARY OF THE INVENTION

One object of the invention is to remove a catalyst without dissolving a polyhydroxycarboxylic acid obtained by a polymerization reaction using a catalyst.

Another object of the invention is to provide a polyhydroxycarboxylic acid which has extremely low content of the catalyst.

As a result of an intensive investigation in order to inexpensively remove the catalyst in the polymer with ease in industry, the present inventors have found that a catalyst contained in polyhydroxycarboxylic acid having an inherent viscosity can be removed by merely bringing solid polyhydroxycarboxylic acid into contact with an acid in the presence of an organic solvent. Thus, the invention has completed.

That is, the aspect of the invention is a purification process of polyhydroxycarboxylic acid which has 0.1–5.0 dl/g of inherent viscosity comprising the solid polyhydroxycarboxylic acid being contacted with an acid substances in the presence of an organic solvent and a polyhydroxycarboxylic acid prepared by a direct dehydration polymerization which contains 200 ppm or less of residual catalyst content.

The invention also provides a purification process of a polyhydroxycarboxylic acid having a bulk density of 0.05~0.6 g/ml.

The invention also provides a purification process of a polyhydroxycarboxylic acid of which solid is contacted with an acid substance of an inorganic acid or organic acid at temperature of 0~60° C.

The process of the present invention can efficiently remove the catalyst with a simple and economically favorable process from solid polyhydroxycarboxylic acid obtained by a catalytic reaction.

The present invention can also provide a polyhydroxycarboxylic acid which is excellent in heat resistance and weather resistance.

DETAILED DESCRIPTION OF PREFERRED EMBODIMENTS

Polyhydroxycarboxylic acid which can be used in the invention is polymers derived from aliphatic polyhydroxycarboxylic acid. Exemplary polymers include homopolymers and copolymers derived from, for example, 2-hydroxyethanoic acid (glycolic acid), 2-hydroxypropanoic acid (lactic acid), 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid 2-hydroxy-2-methylheptanoic acid, 2-hydroxy-2-ethylheptanoic acid 2-hydroxy-2-propylheptanoic acid, 2-hydroxy-2-butylheptanoic acid 2-hydroxy-2-pentylheptanoic acid, 2-hydroxy-2-hexylheptanoic acid 2-hydroxy-2-methyloctanoic acid, 2-hydroxy-2-ethyloctanoic acid 2-hydroxy-2-propyloctanoic acid, 2-hydroxy-2-butyloctanoic acid 2-hydroxy-2-pentyloctanoic acid, 2-hydroxy-2-hexyloctanoic acid 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy 4-methylpentanoic acid, 4-hydroxy-4-methylhexanoic acid, 4-hydroxy-4-ethylhexanoic acid, 4-hydroxy-4-methylheptanoic acid, 4-hydroxy 4-methylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, and 8-hydroxyoctanoic acid.

A preferable polyhydroxycarboxylic acid of the above polymers is a homopolymer or a copolymer having recurring structual units represented by the formula (1):

wherein the fundamental structure is formed through polyester bonding and R is a $C_1$–$C_8$ linear or branched saturated alkylene group.

Some of the above hydroxycarboxylic acids have an optically active carbon and individually include D-isomer, L-isomer and D/L-isomer. However, no particular restriction is imposed upon the form of these isomers in the purification process of the invention. These homopolymers and copolymers can also be used as a mixture. No particular limitation is put upon the composition of these homopolymers and copolymers.

The polymer which can be used in the invention is represented by the formula (1) has an inherent viscosity in the range of 0.1~5.0 dl/g. When the viscosity is less than 0.1 dl/g, solid polymer is difficult to obtain by conventional processes and the purification process of the invention cannot sometimes be applied.

It has been known that the polymer can be usually prepared from a cyclic dimer by the melt polymerization process represented by Japanese Patent Publication SHO 56-14688, or from hydroxycarboxylic acid by the direct dehydration polymerization process represented by Japanese Laid-Open Patent SHO 61-28521. The direct dehydration polymerization of the present invention is a polymerization process that the polymer is directly prepared from such raw materials as hydroxycarboxylic acids or an oligomer thereof in the presence of such a metal or metal compound catalyst as Sn, Ti, Ni and so on by dehydrating generated water from the react ion system. A homopolymer or a copolymer of the hydroxycarboxylic acid having an inherent viscosity of 0.3 dl/g or more can be prepared by the process. A residual catalyst content is represented by a metal content in the polymer. The polymer prepared by any of these processes can be applied to the process of tile invention. No particular restriction is imposed upon the preparation processes of the polymer.

An acid substance which can be used in the invention includes, for example, inorganic acids such as hydrochloric acid, sulfuric acid, nitric acid and phosphoric acid; and organic acids such as acetic acid and p-toluenesulfonic acid. Particularly preferred acids are cheap acids such as hydrochloric acid, sulfuric acid and nitric acid. The acid substances can be used in gas, liquid or solid state.

Amount of the acid substance is preferably in the range of 0.0001~5.0 moles/100 parts by weight, more preferably 0.001~1 mole/100 parts by weight of the polymer. When the amount is less than 0.0001 mole, the effect of catalyst removal is apt to be poor. On the other hand, an amount exceeding 5.0 moles is liable to cause problems such as deterioration of tile Polymer. Further, use of the acid substance in excess has no effect on the catalyst removal and requires an additional purification step in order to successively remove the acid.

Organic solvents which can be used in the invention are not restricted particularly and aromatic hydrocarbon solvents can also be used. However, a hydrophilic solvent such as alcohols, ketones, ethers, carboxylic acids, nitriles and amides is preferably used. Exemplary solvents include alcohols such as methanol, ethanol. propanol, isopropanol, butanol, sec-butanol, tert-butanol, and pentanol; ketones such as acetone and methyl ethyl ketone; ethers such as tetrahydrofuran; carboxylic acids such as acetic acid and butyric acid: nitriles such as acetonitrile; and amides such as N,N-dimethyl formamide, N,N-dimethyl acetamide, 1,3-dimethylimidozolidinone and hexamethyl phosphoramide. Preferred organic solvents are alcohols which are cheap and do not dissolve the polymer. These organic solvents can be used singly or as a mixture.

The process of the invention is a process for removing the catalyst from polyhydroxycarboxylic acid by bringing solid polyhydroxycarboxylic acid into contact with the above acid in the presence of the organic solvent. Solid polyhydroxycarboxylic acid of the invention can be in any form of powder, granule, pellet, flake and block. Such form of the polymer can be generally prepared by known processes, for example a process for dissolving the polymer in a good solvent and successively pouring into or adding dropwise a poor solvent, and a process for dissolving the polymer in a specific solvent by heating and thereafter cooling the solution to precipitate the polymer as disclosed in Japanese Laid-Open Patent SHO 58-206637 and 61-42531. The polymer form prepared by any process can be applied to the process of the invention.

Bulk density of the polymer is preferably 0.6 g/ml or less. Bulk density higher than 0.6 g/ml leads to insufficient contact with the acid and the catalyst sometimes remains in the polymer. On the other hand, bulk density lower than 0.05 g/ml causes quite no problem on catalyst removal, and nevertheless, makes filtration after treatment difficult and sometimes results in problems.

Solid polyhydroxycarboxylic acid is brought into contact with the acid under following conditions. No particular limitation is imposed upon the solid polymer content in the invention, although solid polymer content is generally 3~40% by weight. Contact temperature depends upon polymer stability and is usually 0°~100° C., preferably 0°~60° C. The temperature lower than 0° C. requires cooling capacity in excess and is disadvantageous in cost and in industry. On the other hand, unfavorable deterioration of the polymer is apt to take place at higher temperature than 100° C.

No restriction is put on the pressure at the contact, and the contact can be carried out under atmospheric pressure, reduced pressure and application of pressure.

The contact can be carried out with a slugging method, standing method and column method. No particular restriction is imposed upon the method so long as polyhydroxycarboxylic acid is brought into contact with the acid.

The contact is carried out usually for 0.1~24 hours, preferably for 0.5~8.0 hours. The contact for less than 0.1 hour is liable to make catalyst removal insufficient. On the other hand, the contact for more than 24 hours is unfavorable because deterioration generates depending upon kind of the polymer.

The process of the invention can be carried out batchwise, semibatchwise or continuously.

Properties of the polymer largely depend on the residual amount of the catalyst, and hence, the residual amount is preferably 200 ppm or less, more preferably 50 ppm or less.

The polyhydroxycarboxylic acid obtained by the purification process of the invention is practically exempted from the above defects by the residual catalyst, therefore, it can be used for films or plastics which are excellent in mechanical properties, heat resistance and weather resistance.

EXAMPLES

The present invention will hereinafter be illustrated in detail by way of examples and comparative examples.

In the synthesis examples and examples, an inherent viscosity is expressed by the following formula and measured under the following conditions.

$$\eta inh = \frac{\ln(t/t_0)}{C}$$

where
$t_0$=flow down time of solvent in viscometer.
$t$=flow down time of dilute polymer solution of the same solvent in the same viscometer.
$C$=concentration of solid polymer indicated by grams in 100 ml solvent.

Measurement was carried out at 20° C. by using a solution containing 0.1 g of the solid polymer in 20 ml dichloromethane solvent.

Synthesis Example 1

[Melt polymerization]

To a 2000 ml three-necked flask equipped with a condenser, thermometer and stirrer, 1500 g of 90% L-lactic acid was charged and heated to 150° C. Dehydration reaction was carried out for 8 hours while gradually reducing the pressure to 30 mmHg. Thereafter zinc powder was added and heated at 200° C. for 4 hours under reduced pressure of 5 mmHg while distilling out cyclic dimer of lactic acid (lactide). Yield of lactide was 85% by mole based on lactic, acid. Lactide thus obtained was recrystallized from ethyl acetate and dried. The purified lactide was mixed with 0.1% by weight of a stannous octoate catalyst and 2% by weight of a lauryl alcohol molecular weight controller for the weight of lactic acid and stirred at 180° C. for 4 hours in a nitrogen atmosphere. After finishing the reaction, the reaction mixture was discharged from the bottom of the reactor in the form of a strand. The strand thus obtained was quickly cooled and cut into pellets with a pelletizer. Polylactic acid obtained had an inherent viscosity of 1.50 dl/g.

[Pulverization of polymer]

To a 200 ml three-necked flask, 20 parts by weight of polylactic acid obtained above and 100 parts by weight of xylene were charged and stirred at 140° C. for 2 hours to dissolve polylactic acid. The solution obtained was cooled as intact to the room temperature. The resulting slurry was filtered and the cake was dried in a nitrogen atmosphere. Polylactic acid powder thus obtained had a bulk density of 0.20 g/ml.

Synthesis Example 2

[Direct dehydration polymerization]

36.0 g of 90% L-lactic acid was heated and stirred in a reaction vessel for 3 hours at 150° C. under the reduced pressure of 50 mmHg while water was distilled out and 25.3 g of the oligomer was obtained. 0.088 g of tin powder was added to the oligomer and the reaction was carried out by mixing for 2 hours at 150° C. under the reduced pressure of 30 mmHg. The reaction vessel was equipped with a Dean Stark trap, 0.417 g of tin powder and 75.9 g of diphenyl ether were added to the reactant and azeotropic dehydration polymerization was carried out for 1 hour at 130° C. under the reduced pressure of 12 mmHg so that water is removed. And then, a tube packed with 20 g of molecular sieve 3A was equipped in place of the Dean Stark trap and after the distilled solvent was dried by passing through the tube, the solvent was recycled to the reaction vessel. The reaction was carried out for 48 hours at 130° C. under the reduced pressure of 15 mmHg.

After the end of reaction, the reactant was filtered and cooled to 50° C. so that the polymer precipitated. The solvent was separated by filtration and 21.5 g of white powder of the polymer was obtained (yield 83%). Polylactic acid obtained had an inherent viscosity of 1.50 dl/g. Polylactic acid powder thus obtained had a bulk density of 0.20 g/ml.

EXAMPLE 1

To 20 g of polylactic acid powder of Synthesis Example 2 which had an inherent viscosity of 1.50 dl/g, Sn content of 560 ppm and bulk density of 0.2 g/ml, 40 ml of 0.5N aqueous hydrochloric acid solution and 40 ml of ethanol were added. The mixture was stirred at 35° C. for an hour, filtered and dried. The powder obtained had a bulk density of 0.20 g/ml.

Results are illustrated in Table 1.

EXAMPLE 2~14

The same procedures as described in Example 1 were carried out except that the raw material of polymer, treatment conditions and contact conditions were changed as illustrated in Table 1. Results are illustrated in Table 1.

Comparative Examples 1

The same procedures as described in Example 1 were carried out except that the raw material of polymer, treatment conditions and contact conditions were changed as illustrated in Table 1. Results are illustrated in Table 1.

TABLE 1

| | Raw material | Synthetic method of polymer | Polymer powder | | | Treatment condition | | | | Result | |
| | | | $\eta_{inh}$ (dl/g) | Sn content (ppm) | bulk density (g/ml) | acid/solvent ratio (vol/vol) | solid concentration (wt %/vol) | temperature (°C.) | time (hr) | Sn content (ppm) | $\eta_{inh}$ (dl/g) |
| --- | --- | --- | --- | --- | --- | --- | --- | --- | --- | --- | --- |
| Ex. 1 | L-lactic acid | Synthetic Example 2 | 1.50 | 560 | 0.20 | 0.5 N hydrochloric acid/ethanol = 1/1 | 20 | 35 | 1 | 4 | 1.49 |
| Ex. 2 | ↑ | ↑ | 1.31 | 630 | 0.30 | 1.0 N sulfonic acid/methanol = 1/2 | 25 | 30 | 2 | 2 | 1.31 |
| Ex. 3 | ↑ | ↑ | 0.95 | 600 | 0.10 | 0.5 N hydrochloric acid/isopropanol = 1/1 | 35 | 40 | 2 | 2 | 0.95 |
| Ex. 4 | ↑ | Synthetic Example 1 | 1.31 | 630 | 0.30 | 0.5 N nitric acid/acetone = 1/1 | 20 | 40 | 3 | 3 | 1.32 |
| Ex. 5 | ↑ | Synthetic Example 2 | 1.31 | ↑ | 0.30 | 1.0 N phosphoric acid/DMF*) = 2/1 | 15 | 10 | 4 | 2 | 1.30 |
| Ex. 6 | tactic acid D/L = 1/9 | ↑ | 1.10 | 780 | 0.45 | 1.0 N hydrochloric acid/ethanol = 1/1 | 30 | 25 | 3 | 2 | 1.10 |
| Ex. 7 | ↑ | ↑ | 1.10 | ↑ | ↑ | 0.5 N nitric acid/acetonitrile = 1/1 | 30 | 25 | 3 | 3 | 1.09 |
| Ex. 8 | tactic acid D/L = 5/5 | Synthetic Example 1 | 1.40 | 360 | 0.35 | 1.0 N nitric acid/tetrahydrofurane = 2/1 | 25 | 30 | 4 | 5 | 1.40 |
| Ex. 9 | L-lactic acid/glycolic acid = 9/1 | Synthetic Example 1 | 0.99 | 1300 | 0.26 | 0.5 N hydrochloric acid/ethanol = 1/1 | 10 | 35 | 4 | 4 | 0.90 |
| Ex. 10 | L-lactic acid/DL-3-hydroxy-butyric acid = 9/1 | Synthetic Example 2 | 0.85 | 1200 | 0.20 | 2.0 N hydrochloric acid/ethanol = 2/1 | ↑ | ↑ | ↑ | 2 | 0.85 |
| Ex. 11 | L-lactic acid/DL-4-hydroxy-butyric acid = 9/1 | ↑ | 0.88 | 1500 | 0.22 | 0.5 N hydrochloric acid/ethanol = 2/1 | ↑ | ↑ | ↑ | 3 | 0.88 |
| Ex. 12 | L-lactic acid | ↑ | 1.50 | 560 | 0.20 | 0.5 N hydrochloric acid/ethanol = 1/1 | 20 | 75 | 1 | 2 | 1.38 |
| Ex. 13 | ↑ | ↑ | ↑ | ↑ | ↑ | 0.5 N hydrochloric acid/xylene = 1/1 | 10 | 50 | 6 | 95 | 1.50 |
| Ex. 14 | ↑ | ↑ | ↑ | ↑ | ↑ | 0.5 N hydrochloric acid/o-dichlorobenzene = 1/1 | 10 | 50 | 6 | 87 | 1.50 |
| Comp. Ex. 1 | ↑ | ↑ | ↑ | ↑ | ↑ | 0.5 N HCL/no solvent = 1/0 | 20 | 35 | 1 | 545 | 1.50 | note: *)N,N-dimethyl formamide

Example 15 and 16 and Comparative Example 2

By using L-polylactic acids obtained by Example 1 and 3 and Comparative Example 1, the following heat resistance test and weather resistance test were carried out. Results are illustrated in Table 2.

Heat resistance test:

(1) 5% weight reduction temperature

The temperature at which the weight reduction reaches 5% was measured in the dry air at the temperature elevation rate of 10° C./min with TG/DTA 220 analyzer made by SEIKO DENSHI KOGYO.

(2) MW change

After a sample was heated at 180° C. for 5 min, inherent viscosity of the sample was measured.

Weather resistance test:

A film having a thickness of 100 μm was press-formed from the polyhydroxycarboxylic acid powder at 180° C. and under the pressure of 100 kg/cm². The film obtained was kept in SUGA sunshine weather-o-meter by using of carbon arc light source for 400 hours at the condition of 60° C. 120 min (showering for 18 min). Tensile strength was measured before or after the test, and the retention was calculated.

The examples are not intended to limit the scope of the present invention. This present invention may be practiced or embodied in still other ways without departing from the spirit or essential character thereof.

TABLE 2

|  | Polymer powder | | Heat resistance | | Weather resistence |
|---|---|---|---|---|---|
|  | Sn content (ppm) | ηinh (dl/g) | MW change ηinh (dl/g) | 5% weight reduction temperature (°C.) | tensile strength retention (%) |
| Ex. 15 | 4 | 1.49 | 1.49 | 320 | 95% or more |
| Ex. 16 | 2 | 0.95 | 0.95 | 320 | 95% or more |
| Comp. Ex. 2 | 545 | 1.50 | 1.38 | 296 | impossible by cracking |

What is claimed is:

1. A purification process of a polyhydroxycarboxylic acid having an inherent viscosity of 0.1~5.0 dl/g comprising contacting the solid polyhydroxycarboxylic acid with an acid substance in the presence of an organic solvent.

2. A purification process of claim 1 wherein the polyhydroxycarboxylic acid is a homopolymer or a copolymer having recurring structural units represented by the formula (1):

wherein the fundamental structure is formed through polyester bonding and R is a $C_1$-$C_8$ linear or branched saturated alkylene group.

3. A purification process of claim 1 wherein polyhydroxycarboxylic acid has a bulk density of 0.05~0.6 g/ml.

4. A purification process of claim 1 wherein the acid substance is an inorganic acid or an organic acid.

5. A purification process of claim 1 wherein polyhydroxycarboxylic acid is brought into contact with the acid at a temperature of 0°~60° C.

6. A polyhydroxycarboxylic acid prepared by direct dehydration polymerization comprising the residual catalyst content of 200 ppm or less in the polyhydroxycarboxylic acid.

7. A polyhydroxycarboxylic acid of claim 6 wherein the catalyst is Sn.

* * * * *